United States Patent [19]

Duncan et al.

[11] Patent Number: 5,102,648

[45] Date of Patent: * Apr. 7, 1992

[54] PROCESS FOR THE PRODUCTION OF LITHIUM HYPOCHLORIDE

[75] Inventors: Budd L. Duncan, Athens; Larry D. Carpenter, Cleveland; Leslie R. Osborne, Chattanooga; William T. Wooden, Cleveland, all of Tenn.

[73] Assignee: Olin Corporation, Cheshire, Conn.

[*] Notice: The portion of the term of this patent subsequent to Jul. 2, 2008 has been disclaimed.

[21] Appl. No.: 658,111

[22] Filed: Feb. 25, 1991

Related U.S. Application Data

[63] Continuation-in-part of Ser. No. 489,316, Mar. 2, 1990, Pat. No. 5,028,408.

[51] Int. Cl.$^5$ .............................................. C01B 11/06
[52] U.S. Cl. .................................................... 423/473
[58] Field of Search ..................... 423/473; 252/187.25

[56] References Cited

U.S. PATENT DOCUMENTS

| | | | |
|---|---|---|---|
| 1,481,039 | 1/1924 | Taylor et al. | 252/186.25 |
| 1,481,040 | 1/1924 | Taylor et al. | 423/474 |
| 3,171,814 | 3/1965 | Orazem et al. | 252/187.25 |
| 3,498,924 | 3/1970 | Walsh et al. | 423/474 |
| 4,146,578 | 3/1979 | Brennan et al. | 423/473 |
| 5,028,408 | 7/1991 | Duncan et al. | 423/473 |

FOREIGN PATENT DOCUMENTS

| | | | |
|---|---|---|---|
| 628396 | 5/1963 | Belgium | 423/473 |
| 99152 | 1/1984 | European Pat. Off. | 423/473 |
| 349262 | 12/1970 | U.S.S.R. | 423/473 |
| 581944 | 10/1946 | United Kingdom | 423/473 |

Primary Examiner—John Niebling
Assistant Examiner—Brian M. Bolam
Attorney, Agent, or Firm—James B. Haglind; Paul Weinstein

[57] ABSTRACT

A process for producing lithium hypochlorite which admixes an aqueous hypochlorous acid solution, having a concentration of 35 percent or greater by weight of HOCl, with an aqueous slurry of lithium hydroxide at a temperature in the range of from about 0° to about 20° to produce a solution of substantially pure lithium hypochlorite. The lithium hypochlorite solutions produced can be dried directly or concentrated by cooling. The solid lithium hypochlorite produced is a highly pure source of available chlorine.

19 Claims, No Drawings

PROCESS FOR THE PRODUCTION OF LITHIUM HYPOCHLORIDE

This is a continuation-in-part application of U.S. Ser. No. 07/489,316 filed Mar. 2, 1990 now U.S. Pat. No. 5,028,408, issued July 2, 1991.

This invention is related to the production of concentrated lithium hypochlorite. More particularly, this invention is related to the production of concentrated lithium hypochlorite from pure concentrated solutions of hypochlorous acid.

Lithium hypochlorite has found application as a swimming pool sanitization agent. Current commercial processes for the manufacture of lithium hypochlorite produce a low assay product of approximately 29% by weight of LiOCl by the chlorination of lithium hydroxide. The impurities in the commercial product include chlorates, carbonates, sulfates, and chlorides of potassium, sodium, or lithium. The process is in addition complex and costly.

Various other processes for the manufacture of LiOCl of a higher degree of purity have been described. U.S. Pat. Nos. 1,481,039 and 1,481,040 teach a method for the production of LiOCl with a low level of impurities by chlorination of LiOH. The conformed LiOCl is removed by alcohol extraction to form an alkyl hypochlorite, which is then treated with excess LiOH to recover the LiOCl.

U.S. Pat. No. 3,498,924, issued Mar. 3, 1970 to Walsh et al. describes the reaction of dilute hypochlorous acid solutions with sodium hydroxide. According to the patent, anhydrous sodium hypochlorite, sodium hypochlorite hydrate, and basic sodium hypochlorites can be produced. The authors contemplate the formation of solid products of potassium hypochlorite, lithium hypochlorite, and alkaline earth metal hypochlorites by this reaction.

Surprisingly, now it has been discovered that solid lithium hypochlorite can be produced directly and with ease for use in sanitizing and bleaching applications.

It is an object of the present invention to provide a process for producing lithium hypochlorite which substantially reduces the presence of impurities such as chlorates, carbonates, sulfates, and chlorides.

Another object of the present invention is to provide a process for producing lithium hypochlorite which eliminates the need for extraction with an organic solvent.

An additional object of the present invention is to provide a process for producing lithium hypochlorite which reduces the amount of expensive lithium hydroxide required.

A further object of the present invention is to provide a process for producing lithium hypochlorite which readily dries the lithium hypochlorite product to desired moisture contents at reduced energy requirements and with a minimum of product loss.

A still further object of the present invention is to provide a process for producing lithium hypochlorite which reduces the number of processing steps required.

The novel process for producing lithium hypochlorite comprises admixing a hypochlorous acid solution having a concentration of 35 percent or greater by weight of HOCl with an aqueous slurry of lithium hydroxide at a temperature in the range of from about 0° to about 20° to produce a solution of lithium hypochlorite.

The novel process of the present invention employs as the starting material a concentrated solution of hypochlorous acid, HOCl. A process for producing the concentrated solution of hypochlorous acid is carried out in a suitable reactor such as one provided with means for spraying discrete droplets of an aqueous solution of an alkali metal hydroxide into the reactor; means for feeding gaseous chlorine into the reactor; means for withdrawing solid alkali metal chloride product from the reactor; and means for withdrawing a gaseous mixture comprised of hypochlorous acid, chlorine monoxide, unreacted chlorine and water vapor from the reactor. The reactor, reactant feed lines, or both are provided with suitable heating means for maintaining the reaction at a temperature sufficiently high to vaporize the hypochlorous acid product and water and to dry the alkali metal chloride particles.

Any alkali metal hydroxide capable of reacting with gaseous chlorine to form hypochlorous acid may be employed as a reactant in the process of this invention. Typical examples of suitable alkali metal hydroxides include sodium hydroxide, potassium hydroxide, lithium hydroxide and mixtures thereof. Sodium hydroxide is the preferred reactant since the resulting sodium chloride by-product is more easily disposed of than the other alkali metal chlorides. As gaseous mixtures having high concentrations of hypochlorous acid and chlorine monoxide are desired, highly concentrated aqueous solutions of the alkali metal hydroxide are used. Suitable concentrations include those in the range of from about 40 to about 80, and preferably from about 45 to about 60 percent by weight of alkali metal hydroxide.

The alkali metal hydroxide solution is sprayed from at least one atomizer preferably positioned at or near the top of the reactor. The atomizer is preferably positioned along the central axis of a cylindrical reactor, to provide minimum contact between the atomized droplets and the walls. The atomizer may be directed up, down, sideways or any other orientation that meets the above conditions. Droplet sizes are selected which permit a substantially complete reaction of the droplets of alkali metal hydroxide with chlorine, the vaporization of hypochlorous acid and water produced and the production of substantially dry alkali metal chloride particles having low concentrations of chlorate.

The dry alkali metal chloride particles produced, while smaller than the original droplets, are preferably sufficiently large enough to prevent a significant portion of the particles from being entrained in the gaseous mixture of hypochlorous acid produced.

Typical atomizing techniques of the pneumatic, hydraulic, and spinning disc type, among others, which are suitable for use in the process of this invention, are described in the monograph entitled "Atomization and Spray Graining" by W. R. Marshall, Jr., Chemical Engineering Progress Monograph Series, No. 2, Volume 50, 1954. A gas, such as chlorine gas, under pressure may be used to atomize droplets of aqueous alkali metal hydroxide by premixing before discharge from the nozzle, or the liquid droplets and chlorine gas are mixed after discharge from their respective nozzles. The chlorine gas which reacts with the alkali metal hydroxide is fed directly to the reactor.

The process of for producing concentrated hypochlorous acid employs a large excess of chlorine gas above the stoichiometric amount of alkali metal hydroxide as illustrated by the following equation:

$$Cl_2 + NaOH \rightarrow HOCl + NaCl \quad (1)$$

Suitable excess amounts of chlorine gas include those in which the molar ratio of chlorine to alkali metal hydroxide is equal or greater than about 20:1. For example, excess amounts of chlorine may include molar ratios from 20:1 to about 200:1, preferably from about 25:1 to about 100:1, and more preferably from about 30:1 to about 50:1.

These large excesses of chlorine gas result in increased yields of hypochlorous acid as the formation of chlorate is minimized and its concentration in the alkali metal chloride particles is less than about 10 percent by weight, and preferably less than about 6 percent by weight. In addition, the use of large excesses of chlorine gas provide an improved method of maintaining the reaction temperature. In a continuous process, the gaseous mixture of hypochlorous acid vapor, water vapor, chlorine gas, and chlorine monoxide gas produced in the reactor is removed from the reactor and passed through a solids separator to remove any fine particles of alkali metal chloride which may be present. The solids-free gaseous mixture is then liquified to produce an aqueous solution of hypochlorous acid having, for example, from about 40 to about 60, and preferably from about 45 to about 50 percent by weight of HOCl. The liquefaction may be carried out, for example, by condensing the gaseous mixture at temperatures in the range of from about $-5°$ to about $+10°$ C.

The concentrated hypochlorous acid solution is substantially free of ionic impurities such as alkali metal, chloride, and chlorate ions. For example, concentrations of the chloride ion are less than about 50 parts per million; the alkali metal ion concentration is less than about 50 parts per million; and the chlorate ion concentration is no higher than about 100 parts per million.

The second reactant in the novel process of the present invention is lithium hydroxide in the anhydrous or monohydrated form. The lithium hydroxide employed is, for example, a commercially available industrial grade, preferably having low concentrations of impurities such as lithium chloride. In the process, lithium hydroxide is employed as an aqueous slurry containing from about 10 to about 40%, preferably from about 15 to about 35, and more preferably from about 25 to about 35 percent by weight of LiOH. While lower concentrations of LiOH may be used, their use results in excessive amounts of filtrate for recycle or disposal.

In the novel process of the present invention, the hypochlorous acid solution, having a concentration of 35 percent or greater by weight of HOCl, is admixed with a lithium hydroxide slurry to form a reaction mixture. The reaction mixture is preferably stirred or agitated to provide a homogeneous reaction mixture. During the process, the temperature of the reaction mixture is maintained for example, in the range of from about 0° C. to about 20° C., and preferably from about 5° C. to about 10° C. Additional lithium hydroxide is added until the desired lithium hypochlorite concentration is attained The reaction mixture is monitored for excess alkalinity and when this decreases to about 1 percent or less, addition of HOCl is discontinued, and the product solution is recovered.

The process of the invention is represented by the following equation:

$$LiOH + HOCl \rightarrow LiOCl + H_2O \quad (2)$$

As shown in the above equation, only one mole of lithium hydroxide is required per mole of lithium hypochlorite. The lithium hypochlorite solution produced has a concentration of from about 15 to about 40, and preferably from about 25 to about 40 percent by weight of LiOCl. The product solutions contain small amounts of impurities such as lithium chlorate and lithium chloride which are formed during the reaction.

The lithium hypochlorite solutions produced are highly pure and could be used directly in the sanitizing of water. However it is preferred to use solid forms of lithium hypochlorite.

In one embodiment, solutions of lithium hypochlorite are concentrated by evaporation at sub-atmospheric pressures at temperatures in the range of from about 30° to about 60°, and preferably from about 40° to about 50° C. Suitable pressures are those which are about 10% or less of the vapor pressure of the solution at the concentration temperature. The concentration process is continued until a slurry of lithium hypochlorite containing at least 40 percent by weight, for example, from about 42 to about 50 percent by weight of LiOCl. Excess solution is removed by any suitable solid-liquid separation method such as filtration.

In a preferred embodiment, the solutions of lithium hypochlorite are concentrated by cooling the solutions at about subzero temperatures, for example, at a temperature in the range of from about 0° to about $-20°$ C., and preferably in the range of from about $-5°$ to about $-15°$ C. Crystals of lithium hypochlorite are separated from excess solution by any suitable solid-liquid separation method such as filtration. The crystals recovered may be dried in any suitable manner.

In a more preferred embodiment, the crystals are allowed to melt to form a substantially pure solution of lithium hypochlorite. Melting of the pure lithium hypochlorite crystals takes place at ambient temperatures, however, gentle heating conditions may be employed if desired.

The concentrated solution or slurry of LiOCl is dried using any suitable gentle drying method to produce solid lithium hypochlorite having the desired moisture content. For example, the concentrated LiOCl may be dried in a fluidized bed dryer, a spray dryer, a vacuum pan dryer, etc. where the drying temperature is in the range of from about 50° C. to about 200° C. The low concentrations of impurities in the lithium hypochlorite solutions or crystals minimizes the hygroscopicity of the product permitting ease of drying at reduced energy requirements. Concentrated solutions or slurries of LiOCl are preferably dried in a spray dryer employing inlet temperatures in the range of from about 120° to about 200° C.

The solid lithium hypochlorite product produced is a highly pure source of available chlorine having a concentration of at least 55 percent by weight of LiOCl, and preferably, in the range of from about 75 to about 100 percent by weight of LiOCl. These solid products contain at least 65% of available chlorine, and preferably from about 90 to 120% of available chlorine.

As the process of the invention does not employ extraction with an organic solvent, the product is free of organic impurities. Further, the process employs a molar ratio of the costly lithium hydroxide to hypochlorous acid of about 1:1 in comparison to the processes commercially employed up to the present which require a molar ratio of at least 2:1.

The addition of a potassium compound, such as solid KOH or a solution of KOCl to any LiOCl filtrate recovered results in the precipitation of solid KClO$_3$ which is readily removed from the solution. The remaining filtrate may be utilized to suspend lithium hydroxide for further hypochlorination.

Small amounts of this filtrate may be discarded depending upon the level of the chloride impurities present. It is envisioned that this same technique would be useful in the removal of deleterious Ca(ClO$_3$)$_2$ from solutions generated in the manufacture of calcium hypochlorite.

To further illustrate the invention the following examples are provided without any intention of being limited thereby. All parts and percentages are by weight unless otherwise specified.

EXAMPLE I

A slurry of 15% LiOH (221 g.) was prepared by suspending 79 g of solid LiOH.H$_2$O in water. To this slurry, an aqueous hypochlorous acid solution containing 38 percent by weight HOCl was added until all of the lithium hydroxide had been converted to a solution of lithium hypochlorite. To this solution an additional 79 g of LiOH.H$_2$O was then added and the addition of the aqueous solution of HOCl was continued until the lithium hydroxide was completely converted to a solution of lithium hypochlorite. The solution of LiOCl was then subjected to vacuum evaporation at temperatures increasing from 35° C. to 50° C. Components and their concentrations are given in Table 1 below:

TABLE I

| Component | HOCl* | LiOH* | Slurry* | Paste* |
|---|---|---|---|---|
| HOCl | 38 | | | |
| LiOH | | 57 | 0.8 | 1.7 |
| LiOCl | | | 25.0 | 48.1 |
| LiClO$_3$ | | | 1.6 | 2.7 |
| LiCl | | | 0.8 | 1.2 |
| H$_2$O | 62 | 43 | 71.8 | 46.3 |

*Wt. %

EXAMPLE 2

The process of Example 1 was repeated to produce a paste of lithium hypochlorite containing 40.6 percent by weight of LiOCl. The paste was filtered on a coarse fritted Buchner funnel to produce a filter cake containing 56.2 percent by weight of lithium hypochlorite. This filter cake was then dried in a fluid bed dryer at air temperatures ranging 50° C. to 60° C. The product contained 24.8 percent by weight of moisture. There was little or no decomposition during the drying stage. The components and their concentrations are given in Table 2 below.

TABLE II

| Component | HOCl* | LiOH* | Slurry* | Paste* | Felt* | Cake* | Dried* (50° C.) | Dried* (60° C.) |
|---|---|---|---|---|---|---|---|---|
| | 44.4 | | | | | | | |
| LiOH | | 57 | 0.7 | 1.2 | 1.5 | 0.6 | 1.5 | 0.6 |
| LiOCl | | | 25.4 | 40.6 | 34.7 | 56.2 | 66.6 | 68.4 |
| LiClO$_3$ | | | 1.9 | 3.8 | 4.8 | 2.7 | 3.1 | 4.1 |
| LiCl | | | 1.6 | 2.9 | 3.9 | 2.3 | 3.0 | 2.1 |
| H$_2$O | 55.6 | 43 | 70.4 | 51.5 | 55.1 | 38.2 | 25.8 | 24.8 |

*Wt. %

EXAMPLE 3

The process of Example 2 was repeated to produce a cake containing 59.45% by weight of LiOCl. This cake was dried at a temperature of 83° C. for 60 minutes to produce a product containing 75.0% LiOCl with a moisture content of 12.2% water. The lithium hypochlorite product produced corresponded to a mixture of LiOCl.H$_2$O and anhydrous LiOCl. The dry basis LiOCl was reduced from 88.5% to 85.4%, indicating very slight degradation of the product while drying.

EXAMPLE 4

The process of Example 2 was repeated and a portion of the product placed in constant temperature storage oven at 45° C. and allowed to stand for 30 days at this temperature. The initial product analyzed 75.7% LiOCl by weight. The moisture content was 11%. At the end of thirty days, the product analyzed 73.7% LiOCl by weight. This corresponds to relative loss of sanitizing power of 2.7% over 30 days. This illustrates the surprisingly high stability of the lithium hypochlorite solid produced by this process.

EXAMPLE 5

A slurry of 20% lithium hydroxide (737 g) was prepared by suspending 263 g of solid LiOH.H2O in water. This slurry was then cooled to 0° C. An aqueous hypochlorous acid solution containing 43.7% by weight HOCl was added to the LiOH slurry while maintaining a temperature below 20° C. until the excess alkalinity of the lithium hypochlorite solution reached one percent. An additional 263 g of LiOH.H$_2$O was introduced to the LiOCl solution. The HOCl addition continued at a temperature below 20° C. until the LiOH was completely converted to LiOCl. The LiOCl solution was then vacuum evaporated at temperatures ranging from 45° C. to 50° C. to produce a slurry containing 41.6% by weight of LiOCl. The slurry was vacuum filtered to produce a cake with a LiOCl concentration of 56.4% by weight. The filter cake was then dried in a fluid bed dryer for 20 to 25 minutes at an air temperature of 90° C.

TABLE III

| Component | HOCl* | LiOH* | Solution* | Slurry* | Cake* | Product* |
|---|---|---|---|---|---|---|
| HOCL | 46.0 | | | | | |
| LiOCl | | | 27.8 | 41.6 | 56.4 | 70.1 |
| LiClO$_3$ | | | 1.1 | 2.1 | 3.4 | 5.2 |
| LiCl | | | 1.2 | 2.2 | 3.1 | 8.2 |
| LiOH | | 57.0 | 1.0 | 1.5 | 1.8 | 3.2 |
| H$_2$O | 54.0 | 53.0 | 68.9 | 52.6 | 53.3 | 13.3 |

*Wt. %

EXAMPLE 6

A slurry of 20% lithium hydroxide (13,274 g) was prepared by suspending 4737 g of LiOH.H$_2$O in water. The slurry was then cooled to 0.° C. While maintaining a temperature below 10° C., an aqueous hypochlorous acid solution containing 47% by weight HOCl was added to the LiOH slurry until the excess alkalinity approached one percent. An additional 4737 g of LiOH.H₂O was introduced to the LiOCl solution. The HOCl addition was continued at a temperature below 20° C. until the alkalinity of the solution was below 1%. The LiOCl solution was then spray dried at an inlet temperature ranging from 210° C. to 260° C. and an atomizer air pressure of 20 to 25 lbs. The exit temperature of the dryer system ranged from 100° C. to 130° C. The dried solid LiOCl had the consistency of powder with an 18.7% water content.

TABLE IV

| Component | HOCl* | LiOH* | Solution* | Product* |
|---|---|---|---|---|
| HOCl | 47.0 | | | |
| LiOCl | | | 29.1 | 57.2 |
| LiClO₃ | | | 0.5 | 5.7 |
| LiCl | | | 2.0 | 13.1 |
| LiOH | | 57.0 | 0.7 | 5.3 |
| H₂O | 53.0 | 43.0 | 67.7 | 18.7 |

*Wt. %

EXAMPLE 7

Deionized water (8537 g) and 4737 g of LiOH.H₂O were mixed in a 15 gallon reactor. The slurry was cooled to 3° C. and 48% HOCl was added at a rate to maintain the temperature between 0° C. and 15° C. As the alkalinity decreased, solid LiOH.H₂O was added to the reactor. A total of 18,948 g of LiOH.H₂O was added to the reactor. The HOCl flow was shut off when the residual alkalinity of the LiOCl solution, as measured by a "drop test", was reduced to less than 1%. The LiOCl solution was poured into a container and refrigerated at a temperature of 2°-5° C. After 6 days the solution was fed directly to a spray dryer operated at an inlet temperature of 175° C. and an outlet temperature of 98° C. During the drying operation, a collection chamber filled with dry product. After one hour dried LiOCl crystals were removed from the collection chamber and analyzyed. The analysis is reported as Example 7a below. Dried LiOCl crystals were removed from the collection chamber after 2 hours of drying and again after 3 hours of drying. The analyses are reported below as Examples 7b and 7c respectively.

| | Solution* |
|---|---|
| LiOCl | 31.4 |
| LiClO₃ | 1.3 |
| LiCl | 0.8 |
| LiOH | 0.5 |
| H₂O | 66.0 |

| | Spray Dried LiOCl Crystals*: | | |
|---|---|---|---|
| | Example 7a | Example 7b | Example 7c |
| LiOCl | 75.13 | 76.43 | 74.84 |
| LiClO₃ | 5.39 | 5.32 | 5.70 |
| LiCl | 6.15 | 6.58 | 6.64 |
| LiOH | 0.00 | 2.02 | 1.73 |
| H₂O | 13.33 | 9.65 | 11.09 |

*Wt. %

EXAMPLE 8

Deionized water (8537 g) and 4737 g of LiOH.H₂O were mixed in a 15 gallon reactor. The slurry was cooled to 3° C. and 48% HOCl was added at a rate to maintain the temperature between 0° C. and 15° C. As the alkalinity decreased, solid LiOH.H₂O was added to the reactor. A total of 18,948 g of LiOH.H₂O was added to the reactor. The HOCl flow was shut off when the residual alkalinity of the LiOCl solution, as measured by a "drop test", was reduced to less than 1%. A container of the LiOCl solution was refrigerated at a temperature of 2°-5° C. After 23 days the solution was stored in a freezer at −6° C. After 6 days the frozen LiOCl crystal agglomerates were removed and exposed to ambient conditions for 24 hours. The crystal agglomerates, having sizes in the range of about 1.2 to 3.6 centimeters, were then readily separated by filtration from the mother liquor and both the crystals and the mother liquor were analyzed. The crystals were allowed to melt at room temperature and the concentrated solution formed was fed directly to the spray dryer. The spray dryer was operated at an inlet temperature of 145°-160° C. and an outlet temperature of 90°-120° C. During the drying operation, a collection chamber filled with dry product. After 70 minutes dried LiOCl crystals were removed from the collection chamber and analyzed. The analysis is reported as Example 8a below. Dried LiOCl crystals were removed from the collection chamber after 2.5 hours of drying and analyzed (Example 8b). At this time the dryer was shutdown, cleaned and restarted. After 2 additional hours of drying the dried LiOCl crystals in the collection chamber were removed and analyzed (Example 8c).

| Analysis: | Original Solution* | LiOCl Crystals* | LiOCl Filtrate* |
|---|---|---|---|
| LiOCl | 32.43 | 38.99 | 15.76 |
| LiClO₃ | 0.48 | 0.59 | 3.30 |
| LiCl | 0.88 | 0.53 | 4.66 |
| LiOH | 0.26 | 0.00 | 1.00 |
| H₂O | 65.95 | 59.89 | 75.23 |

| | Spray Dried LiOCl Crystals*: | | |
|---|---|---|---|
| | Example 8a | Example 8b | Example 8c |
| LiOCl | 78.19 | 77.07 | 81.51 |
| LiClO₃ | 3.47 | 4.92 | 5.40 |
| LiCl | 4.07 | 5.36 | 6.47 |
| LiOH | 0.94 | 1.34 | 1.55 |
| H₂O | 13.33 | 11.31 | 5.07 |

*Wt. %

What is claimed is:

1. A process for producing lithium hypochlorite which comprises admixing an aqueous hypochlorous acid solution having a concentration of 35 percent or greater by weight of HOCl with an aqueous slurry of lithium hydroxide to produce a solution of lithium hypochlorite, and cooling the solution of lithium hypochlorite at temperatures in the range of from about 0° to about −20° C. to produce crystals of lithium hypochlorite.

2. The process of claim 1 in which the molar ratio of lithium hydroxide to hypochlorous acid is about 1:1.

3. The process of claim 1 in which the solution of lithium hypochlorite contains from about 15 to about 40 percent by weight of LiOCl.

4. The process of claim 1 which is accomplished by separating the crystals of lithium hypochlorite from a mother liquor.

5. The process of claim 4 which is accomplished by drying the crystals of lithium hypochlorite at a temperature of from about 50° to about 200° C. to produce a solid lithium hypochlorite containing at least 55 percent by weight of LiOCl.

6. The process of claim 4 which is accomplished by melting the crystals of lithium hypochlorite to form a purified solution of lithium hypochlorite.

7. The process of claim 6 in which the purified solution of lithium hypochlorite contains from about 30% to about 40 percent by weight of LiOCl.

8. The process of claim 7 in which the solid lithium hypochlorite contains from about 75 to about 100 percent by weight of LiOCl.

9. A process for producing lithium hypochlorite which comprises:
   a) admixing an aqueous hypochlorous acid solution having a concentration of 35 percent or greater by weight of HOCl with an aqueous slurry of lithium hydroxide to produce a solution of lithium hypochlorite containing from about 15 to about 40 percent by weight of LiOCl, and,
   b) spray drying the aqueous solution of lithium hypochlorite at an inlet temperature of from about 120° to about 200° C. to produce a solid lithium hypochlorite containing at least about 55 percent by weight of LiOCl.

10. The process of claim 9 in which the molar ratio of lithium hydroxide to hypochlorous acid is about 1:1.

11. The process of claim 10 in which the solution of hypochlorous acid has a concentration of from about 40 to about 60 percent by weight of HOCl.

12. A process for producing lithium hypochlorite which comprises:
   a) admixing an aqueous hypochlorous acid solution having a concentration of 35 percent or greater by weight of HOCl with lithium hydroxide to produce a solution of lithium hypochlorite,
   b) cooling the solution of lithium hypochlorite to produce a slurry of lithium hypochlorite crystals,
   c) separating the lithium hypochlorite crystals from a mother liquor, and,
   d) spray drying the lithium hypochlorite crystals at an inlet temperature of from about 120° to about 200° C. to produce a solid lithium hypochlorite containing from about 75 to about 100 percent by weight of LiOCl.

13. The process of claim 12 which is accomplished by melting, prior to step d), lithium hypochlorite crystals to form a purified solution of lithium hypochlorite.

14. The process of claim 12 in which potassium hydroxide or potassium hypochlorite is admixed with the mother liquor.

15. The process of claim 12 in which the solution of lithium hypochlorite contains from about 25 to about 40 percent by weight of LiOCl.

16. The process of claim 3 accomplished by cooling the solution of lithium hypochlorite at temperatures in the range of from about −5° to about −15° C.

17. The process of claim 12 accomplished by cooling the solution of lithium hypochlorite at temperatures in the range of from about 0° to about −20° C.

18. The process of claim 15 accomplished by cooling the solution of lithium hypochlorite at temperatures in the range of from about −5° to about −15° C.

19. A process for purifying lithium hypochlorite solutions containing chlorate ions which comprises admixing potassium hydroxide or potassium hypochlorite with the solution of lithium hypochlorite to precipitate potassium chlorate.

* * * * *